(12) United States Patent
Yamoaka et al.

(10) Patent No.: US 7,128,048 B2
(45) Date of Patent: Oct. 31, 2006

(54) CONTROL APPARATUS AND CONTROL METHOD FOR MULTI-CYLINDER ENGINE

(75) Inventors: Shiro Yamoaka, Tokyo (JP); Toshiharu Nogi, Tokyo (JP); Atsushi Shimada, Tokyo (JP); Nobuyasu Kanekawa, Tokyo (JP); Youichi Iihoshi, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/390,771

(22) Filed: Mar. 19, 2003

(65) Prior Publication Data

US 2004/0050363 A1 Mar. 18, 2004

(30) Foreign Application Priority Data

Sep. 17, 2002 (JP) .............................. 2002-270634

(51) Int. Cl.
*F02D 41/14* (2006.01)
*B60W 10/06* (2006.01)
*B60W 50/06* (2006.01)

(52) U.S. Cl. ..................... 123/305; 123/27 R; 123/435; 477/115

(58) Field of Classification Search ................ 123/305, 123/435, 27 R; 477/115
See application file for complete search history.

(56) References Cited

U.S. PATENT DOCUMENTS

| | | | | |
|---|---|---|---|---|
| 4,466,408 A | * | 8/1984 | Cheklich | ..................... 123/435 |
| 6,354,264 B1 | * | 3/2002 | Iwakiri et al. | .............. 123/305 |
| 2004/0194754 A1 | * | 10/2004 | Yamaoka et al. | ........... 123/295 |
| 2004/0194759 A1 | * | 10/2004 | Yamaoka et al. | ............ 123/435 |

* cited by examiner

*Primary Examiner*—Andrew M. Dolinar
(74) *Attorney, Agent, or Firm*—Crowell & Moring LLP

(57) ABSTRACT

In a multi-cylinder engine having a compression ignition combustion mode, a vibration detecting sensor that is preferably mounted in a cylinder block or a cylinder head is used to detect a frequency and the detected frequency is appropriately analyzed to detect or estimate a cylinder pressure peak value and peak timing for each cylinder. An amount of internal EGR, a fuel injection condition, an engine speed and the like are then controlled so as to bring each of these parameters into an appropriate range thereof. The control apparatus suppresses variations in combustion states among different cylinders and different cycles arising from unit-to-unit variations or deterioration in the engine or part-to-part variations or deterioration in a component thereof.

8 Claims, 7 Drawing Sheets

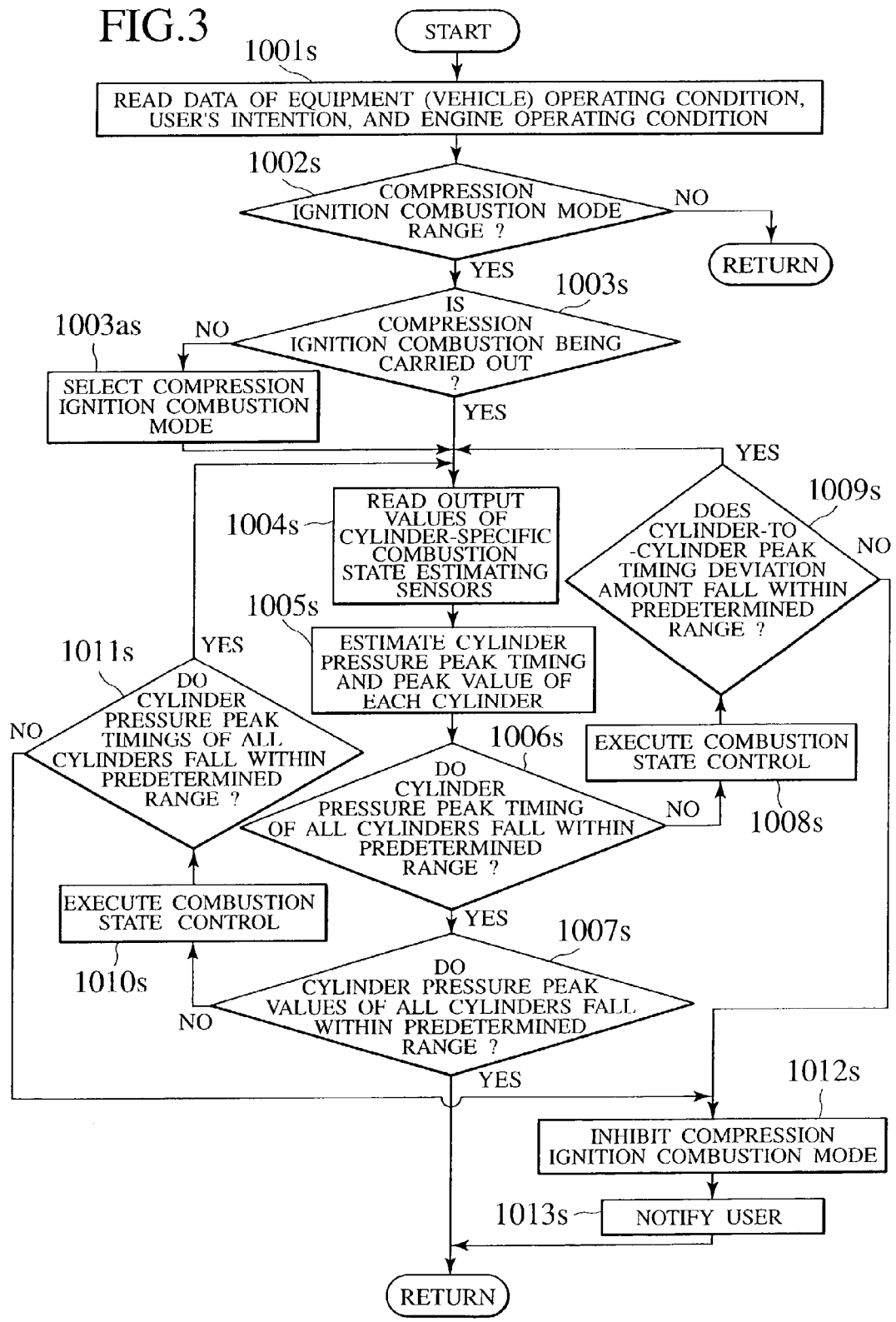

CONTROL APPARATUS AND CONTROL METHOD FOR MULTI-CYLINDER ENGINE

BACKGROUND OF THE INVENTION

The present invention relates to a control apparatus and a control method for a multi-cylinder engine and, more particularly, to a control apparatus and a control method for a multi-cylinder engine that suppresses, in a favorable manner, variations in an ignition combustion state among different cylinders during an engine operation in a compression ignition combustion mode.

There is known a multi-cylinder engine that works on a combustion principle, in which a premixture is compressed and self-ignited. This type of engine is, what is called, a homogeneous charge compression ignition combustion multi-cylinder engine. It is desired that this type of engine be controlled in a favorable manner so that it performs a self-ignition combustion that exhibits high efficiency over a wide operating range. For example, Japanese Patent Laid-open No. 2000-320333 discloses a technique, in which valve timing of intake and exhaust valves are controlled so as to provide a valve shutoff period (minus overlap) in the cylinder. This minus overlap period and fuel injection timing are controlled in accordance with changing operating conditions, thereby controlling self-ignition combustion of a mixture.

The technique disclosed in the aforementioned publication is intended to control various components of the engine according to engine operating conditions. If, for example, there are part-to-part variations among those engine components or if any deteriorates, however, a symptom could occur, in which an ignition timing and combustion state vary from one cylinder to another and from one cycle to another even under the same operating conditions. This symptom could cause pre-ignition or misfire to occur in one or more cylinders of the engine. There is as a result a problem arising, in which fuel consumption and the state of exhaust emissions are seriously aggravated.

In a commonly known spark ignition multi-cylinder (gasoline) engine, control is provided with the ignition timing of an ignition plug first established. In a diesel engine, too, combustion control is provided with the ignition timing for fuel spray first established. Both are equipped with an ignition trigger and capable of an extremely powerful and highly robust combustion control. There has therefore been little necessity to identify detailed combustion states for each cylinder and provide combustion control based the combustion states.

With the homogeneous charge compression ignition combustion multi-cylinder engine, however, it is assumed that a premixture of air and fuel self-ignites as a piston compresses it. For that reason, this type of engine is not provided with any powerful ignition trigger as in the spark ignition engine or the like described earlier and a combustion period thereof is shorter than that of the spark ignition type or the like. This very fact enables operation at high efficiency with low exhaust emissions. At the same time, even the slightest variations in the cylinder structure greatly affects a combustion condition, which eventually aggravates fuel consumption and the state of exhaust emissions. This gives a good reason to believe that there is a cylinder or two, in which combustion does not occur normally, even if each of all cylinders is controlled in exactly the same manner. It is ascertained through experiments conducted by the applicant.

SUMMARY OF THE INVENTION

The present invention has been made in view of the aforementioned problem. It is therefore an object of the present invention to provide a control apparatus and a control method for a multi-cylinder engine having a compression ignition combustion mode as an operating mode in which variations in the combustion state among different cylinders and different cycles arising from unit-to-unit variations or deterioration in the engine or part-to-part variations or deterioration in a component thereof can be suppressed.

To achieve the foregoing object, a control apparatus for a multi-cylinder engine according to one aspect of the present invention is basically applicable to a multi-cylinder engine that is capable of performing compression ignition combustion, or selecting either the compression ignition combustion or spark ignition combustion. The control apparatus is provided with a cylinder-specific combustion state estimating means that estimates a combustion state for each cylinder and a combustion state control means that controls the combustion state for each cylinder. The combustion state control means controls, during an engine operation in a compression ignition combustion mode, the combustion state for each cylinder based on the combustion state estimated by the cylinder-specific combustion state estimating means during the compression ignition combustion mode.

With this arrangement, the control apparatus for a multi-cylinder engine according to the aspect of the present invention can estimate the combustion state for each cylinder during the engine operation in the compression ignition combustion mode. It is further able to provide a combustion control for each cylinder based on the estimated combustion state for each cylinder. Should there be part-to-part variations among components of the multi-cylinder engine or should any deteriorate, therefore, the control apparatus can provide a best possible combustion control for each cylinder in accordance with the part-to-part manufacturing variations and deterioration to correct variations in the combustion state among different cylinders and different cycles. This can therefore realize compression ignition combustion offering good fuel consumption and exhaust emissions characteristics.

A control apparatus for a multi-cylinder engine according to another aspect of the present invention is characterized in the following points. That is, the cylinder-specific combustion state estimating means estimates a peak value of a cylinder pressure of each cylinder and a peak timing of the cylinder pressure. The combustion state control means provides control so that the peak value of the cylinder pressure of each cylinder falls within a predetermined range and/or the peak timing falls within a predetermined period of time after piston top dead center. The control apparatus is further characterized in that the combustion state control means controls other combustion states, including a mode changeover between spark ignition combustion and compression ignition combustion and the like based on the operating condition of the multi-cylinder engine, the operating condition of a piece of equipment mounted with the multi-cylinder engine, an intention of a user of the equipment and the like.

With this arrangement, the control apparatus for a multi-cylinder engine according to the aspect of the present invention can accurately estimate the combustion state of each cylinder during an engine operation in the compression ignition combustion mode. That is, if good combustion is being carried out in the compression ignition combustion mode, the peak timing of the cylinder pressure coincides with peak timing of heat generation at predetermined timing after top dead center. It is therefore possible to estimate the combustion state of each cylinder by detecting the cylinder pressure peak value and the peak timing. Although depending on operating conditions, an operation at high efficiency can be achieved if the peak timing falls within a predetermined range of 0 and 10° after the top dead center.

A control apparatus for a multi-cylinder engine according to still another aspect of the present invention is characterized in the following point. That is, the cylinder-specific combustion state estimating means estimates the combustion state based on a signal provided by at least either one of the following components: a vibration detecting sensor provided on a cylinder block or a cylinder head of the multi-cylinder engine; at least one rotary electric motor connected directly or by way of a gear to an output shaft of the multi-cylinder engine; and, a cylinder pressure sensor disposed in at least one of the plurality of cylinders of the multi-cylinder engine.

As configured as described in the foregoing, the control apparatus for a multi-cylinder engine according to the aspect of the present invention uses the vibration detecting sensor and, by appropriately analyzing a frequency of one vibration detecting sensor signal, can estimate the peak value and the peak timing of the cylinder pressure individually for each cylinder. As a result, the control apparatus can estimate the combustion state for each cylinder during the engine operation in the compression ignition combustion mode at low cost and appropriately. By using the rotary electric motor connected directly or by way of a gear to the output shaft of the multi-cylinder engine, the control apparatus can detect highly accurately engine torque during the engine operation in the compression ignition combustion mode, which allows it to estimate the combustion state of each cylinder. Furthermore, the control apparatus may use the cylinder pressure sensor to take a direct reading of a highly accurate cylinder pressure for each cylinder, which makes it possible to precisely estimate, from the cylinder pressure condition, the combustion state of each cylinder.

A control apparatus for a multi-cylinder engine according to a further aspect of the present invention is characterized in the following point. That is, the combustion state control means controls at least one of the following mechanisms: a variable valve mechanism that varies the amount of internal EGR by changing at least one of the valve timing and valve lift amount of an intake valve and an exhaust valve; a fuel injection mechanism that directly or indirectly injects fuel into a combustion chamber of the multi-cylinder engine; and, a transmission that transmits output shaft torque of the multi-cylinder engine to a power train mechanism of a vehicle through adjusting a gear ratio.

With the arrangement as described in the foregoing, the control apparatus for a multi-cylinder engine according to the aspect of the present invention can control the combustion state so that the peak value and the peak timing of the cylinder pressure of each cylinder fall within an appropriate range during the engine operation in the compression ignition combustion mode. The control apparatus accomplishes this task by controlling the variable valve mechanism, the fuel injection mechanism, and the transmission, either independently or coordinately, according to a command issued by the combustion state control means, should necessity arise to change the combustion state of each cylinder as determined based on the results of estimation made by the cylinder-specific combustion state estimating means.

A control apparatus for a multi-cylinder engine according to a still further aspect of the present invention is characterized in the following points. In one, the combustion state control means controls the variable valve mechanism so as to increase a minus overlap amount, thereby increasing the amount of internal EGR and/or the transmission so as to change the gear ratio, thereby decreasing an engine speed. The control apparatus performs the aforementioned control operations when it is estimated that the peak value of cylinder pressure of at least one of the plurality of cylinders is lower than the predetermined value, or the peak timing of cylinder pressure is retarded in relation to the predetermined timing, based on the estimation made by the cylinder combustion state estimating means. In the other, the combustion state control means controls the variable valve mechanism so as to decrease the minus overlap amount, thereby decreasing the amount of internal EGR and/or the transmission so as to change the gear ratio, thereby increasing the engine speed. The control apparatus performs the aforementioned control operations when it is estimated that the peak value of cylinder pressure of at least one of the plurality of cylinders is higher than the predetermined value, or the peak timing of cylinder pressure is advanced in relation to the predetermined timing, based on the estimation made by the cylinder combustion state estimating means.

With the arrangement as described in the foregoing, the control apparatus for a multi-cylinder engine according to the aspect of the present invention can appropriately control the peak value and peak timing of the cylinder pressure for each cylinder. It can thereby suppress variations in the combustion state among different cylinders and different cycles during the engine operation in the compression ignition combustion mode, thus realizing compression ignition combustion offering good fuel consumption and exhaust emissions characteristics.

Specifically, it is determined whether the peak timing of each cylinder is advanced or retarded in relation to the timing within the predetermined range. If it is determined that the peak timing is advanced, the variable valve is controlled so as to increase the amount of internal EGR, thus improving ignitability of mixtures in all cylinders, that is, advancing the ignition timing. If the engine speed is relatively high (2,000 revolutions per minute or more), however, compression ignition combustion can at times fail due to the amount of intake air being decreased as the internal EGR amount increases. The transmission is therefore controlled so as to slightly decrease the engine speed, thereby increasing the amount of fuel per one cycle for a greater ignitability. If it is determined that the peak timing is retarded, the variable valve is controlled so as to decrease the amount of internal EGR, thereby retarding the ignition timing for all cylinders. At this time, the transmission may be controlled so as to slightly increase the engine speed, thereby decreasing the amount of fuel per one cycle to provide an equivalent power output.

It is next determined whether or not the peak value of each cylinder falls within the predetermined range. If it is determined that the peak value is lower, the variable valve is controlled so as to increase the amount of internal EGR, thereby improving ignitability of the mixtures of all cylinders, thus allowing a condition, in which heat tends to be generated from combustion, to develop. As noted earlier, if the engine speed is relatively high (2,000 revolutions per minute or more), compression ignition combustion can at times fail due to the amount of intake air being decreased as the amount of internal EGR increases. At this time, therefore, the transmission may also be controlled so as to slightly decrease the engine speed, thereby increasing the amount of fuel per one cycle to provide an equivalent power output.

A control apparatus for a multi-cylinder engine according to a yet further aspect of the present invention is characterized in the following points. Specifically, the combustion state control means either increases or decreases the amount of fuel supplied from the fuel injection mechanism to each cylinder per one cycle. The fuel injection mechanism is a type that injects fuel directly into the cylinder. The combustion state control means provides control so as to effect at least one fuel injection during a minus overlap period by the variable valve mechanism during the compression ignition combustion mode. If the cylinder-specific combustion state estimating means estimates that the cylinder pressure peak value of at least one cylinder out of the plurality of cylinders is lower than the predetermined value, or the cylinder pressure peak timing of at least one of the plurality of cylinders is retarded in relation to the predetermined timing, the combustion state control means controls the fuel injection mechanism to increase the amount of fuel injected from the mechanism into the cylinder during the minus overlap period. Alternatively, if the cylinder combustion state estimating means estimates that the cylinder pressure peak value of at least one cylinder out of the plurality of cylinders is higher than the predetermined value, or the cylinder pressure peak timing of at least one of the plurality of cylinders is advanced in relation to the predetermined timing, the combustion state control means controls the fuel injection mechanism to decrease the amount of fuel injected from the mechanism into the cylinder during the minus overlap period.

With the arrangement as described in the foregoing, the control apparatus for a multi-cylinder engine according to the aspect of the present invention can arbitrarily control the condition of the mixture by varying the injection timing or the like according to operating conditions, if the direct fuel injection system is employed. The control apparatus may be applied to a system in which a fuel injection sequence is carried out a plurality of times during the minus overlap period so as to make part of the fuel radical, and the ratio of injection is varied among different cylinders, which allows the apparatus to suppress variations in the combustion state among different cylinders.

A control apparatus for a multi-cylinder engine according to a yet further aspect of the present invention is characterized in the following points. Specifically, if the cylinder-specific combustion state estimating means estimates that the cylinder pressure peak value of at least one cylinder out of the plurality of cylinders falls outside the predetermined range, or the cylinder pressure peak timing of at least one of the plurality of cylinders falls outside the predetermined period of time, the control apparatus inhibits the compression ignition combustion mode for the multi-cylinder engine. Alternatively, the control apparatus switches the operating mode to the spark ignition combustion mode. The control apparatus according to this aspect is also characterized in that it warns the user of the equipment mounted with the multi-cylinder engine, if the control apparatus inhibits the compression ignition combustion mode.

The cylinder pressure peak value of the cylinder may still fall outside the predetermined range, or the cylinder pressure peak timing may remain outside the predetermined period of time even through combustion state control. In such cases, it could become impossible to run the engine in the compression ignition combustion mode with high efficiency and low exhaust emissions because of a deteriorated or defective engine part. If this happens, the control apparatus for a multi-cylinder engine according to the aspect of the present invention can, thanks to the arrangement as described in the foregoing, inhibit the engine operation in the compression ignition combustion mode and suspend the operation. Alternatively, the control apparatus can switch to the spark ignition combustion mode and warns the user that the engine is no longer able to carry out high efficiency operation.

A control method for a multi-cylinder engine according to one aspect of the present invention is substantially one for performing compression ignition combustion control, or control to select either the compression ignition combustion or spark ignition combustion. During an engine operation in the compression ignition combustion mode, the method estimates a combustion state for each cylinder and controls the combustion state for each cylinder based on the estimated combustion state for each cylinder. The control method is further characterized by controlling other combustion states, including a mode changeover between spark ignition combustion and compression ignition combustion, and the like based on the operating condition of the multi-cylinder engine, the operating condition of a piece of equipment mounted with the multi-cylinder engine, an intention of a user of the equipment and the like.

In a control method for a multi-cylinder engine according to another aspect of the present invention, the step of estimating the combustion state of each cylinder is to estimate a peak value of a cylinder pressure for each cylinder and a peak timing of the cylinder pressure. The step of controlling the combustion state is to ensure that the peak value of the cylinder pressure for each cylinder falls within a predetermined range and/or the peak timing falls within a predetermined period of time after piston top dead center.

In a control method for a multi-cylinder engine according to still another aspect of the present invention, the cylinder pressure of each cylinder represents a value that is the result of analyzing a vibration frequency detected of the multi-cylinder engine, or a value of a cylinder pressure sensor disposed in at least one of the plurality of cylinders of the multi-cylinder engine.

A control method for a multi-cylinder engine according to a further aspect of the present invention controls compression ignition combustion or controls to select either the compression ignition combustion and spark ignition combustion. During the engine operation in the compression ignition combustion mode, the method estimates the combustion state for each cylinder during the engine operation in the compression ignition combustion mode. If at least either one of the following conditions is estimated, the method allows a variable valve mechanism of the cylinder to increase or decrease a minus overlap amount so as to increase or decrease an internal EGR amount, thereby controlling the combustion state. The conditions are that the peak value of the cylinder pressure of at least one cylinder of all the plurality of cylinders is lower or higher than a predetermined value, and that the peak timing of the cylinder pressure is retarded or advanced in relation to a predetermined timing. Furthermore, if at least either one of the following conditions is estimated, the method allows a transmission to change a gear ratio so as to increase or decrease an engine speed, thereby increasing or decreasing the amount of fuel supplied from a fuel injection mechanism to each cylinder per one cycle. The conditions are that the peak value of the cylinder pressure of at least one cylinder of all the plurality of cylinders is lower or higher than the predetermined value, and that the peak timing is retarded or advanced in relation to the predetermined timing.

BRIEF DESCRIPTION OF THE DRAWINGS

Other objects and advantages of the invention will become apparent from the following description of embodiments with reference to the accompanying drawings in which:

FIG. 3 shows a flowchart for control operations performed by the multi-cylinder engine control apparatus while the engine is running in the compression ignition combustion mode;

DETAILED DESCRIPTION OF THE PREFERRED EMBODIMENTS

A control apparatus and a control method for an engine according to preferred embodiments of the present invention will be described in detail with reference to the accompanying drawings.

Figure 1:
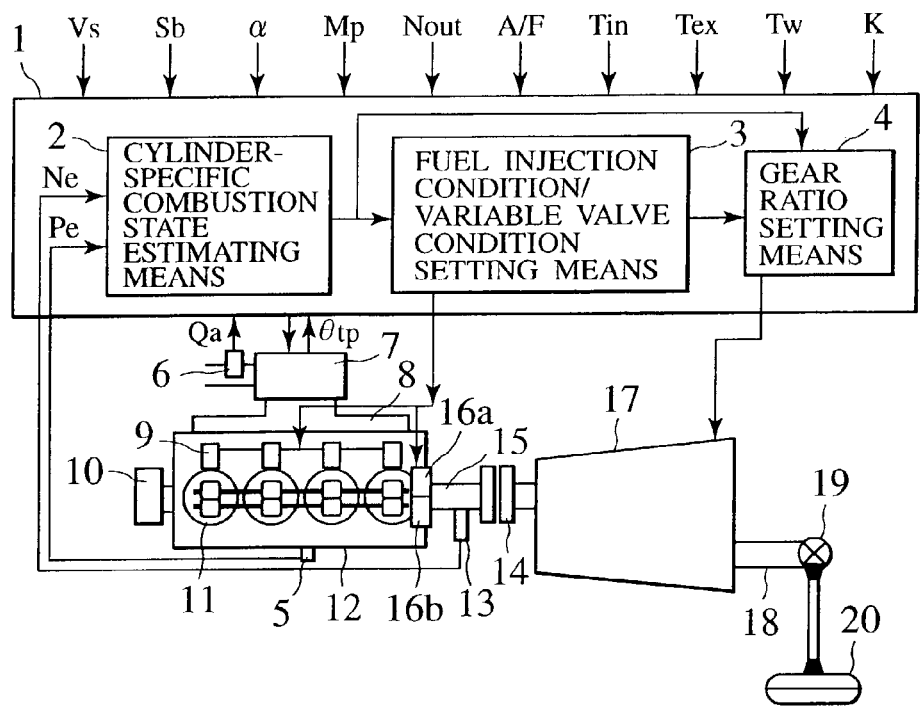
FIG. 1 is a system configuration diagram showing a multi-cylinder engine control apparatus according to a first embodiment of the present invention.

FIG. 1 is a system configuration diagram showing an engine control apparatus according to a first embodiment of the present invention. An engine 12 is a multi-cylinder engine. The multi-cylinder engine 12 is configured so as to carry out combustion in either of two different modes: a spark ignition combustion using an ignition system and a compression ignition combustion, in which a mixture is self-ignited by piston compression.

Specifically, the multi-cylinder engine 12 is capable of performing a high-efficiency operation using the compression ignition combustion mode in a low-speed, light-load range. More specifically, the range is an engine operating range of up to about a half of full load in terms of an engine torque and about 3,000 revolutions per minute, or rpm, in terms of an engine speed. It performs spark ignition combustion in any other load ranges.

The engine 12 is provided with a vibration detecting sensor 5 disposed in a cylinder block or a cylinder head that forms a plurality of cylinders thereof. In addition, there are disposed an air flow sensor 6 on an upstream side where air is drawn in, a throttle 7 located downstream therefrom for adjusting the amount of air, an intake port 8, a fuel injection valve (hereinafter referred to as an "injector") 9 provided for each of the plurality of cylinders, and a speed sensor 13. Preferably, the injector 9 is a type that directly injects fuel into a combustion chamber 11 of each cylinder and the throttle 7 is an electronic control throttle, in which a throttle valve is driven by an electric actuator.

The engine 12 is further provided with variable valves 16a, 16b and a power train control unit (control device) (hereinafter referred to as the PCU) 1.

Driving a starter 10 starts the operation of the engine 12. An output shaft 15 of the engine 12 is connected to a transmission 17 of a vehicle through a friction clutch 14. It is further connected by way of a transmission output shaft 18, a reduction gear 19 and the like to a wheel 20. It is desirable that the transmission 17 be a continuously variable transmission type (hereinafter referred to as a CVT), with which a required speed can easily be achieved.

The PCU (control device) 1 receives inputs of a vehicle speed Vs, a brake signal Sb, an accelerator opening α, a gear ratio (gear position) Mp, a transmission output shaft speed Nout and the like as means of recognizing (detecting) a vehicle operating condition and a user's intention. The PCU 1 also receives, as means of identifying an engine operating condition, inputs of an air-fuel ratio A/F, an engine intake air temperature Tin, an engine exhaust gas temperature Tex, an engine-cooling water temperature Tw, an engine vibration Pe supplied from the vibration detecting sensor 5, an engine speed Ne, a throttle opening θtp and the like.

The PCU (control device) 1 functions to determine the controlled states of the engine 12, the transmission 17 and the like. The PCU 1 is provided at least with a combustion state control means including a cylinder-specific combustion state estimating means 2 for the compression ignition combustion mode, a fuel injection condition/variable valve condition setting means 3, and a gear ratio setting means 4.

The cylinder-specific combustion state estimating means 2 uses data representing the speed Ne of the engine 12, the vibration Pe provided by the vibration detecting sensor 5 and the like to estimate a combustion state of each cylinder. The cylinder combustion state estimating means 2 then outputs data indicating the estimated combustion state to the fuel injection condition/variable valve condition setting means 3 and the gear ratio setting means 4. The PCU 1 makes the means 2 to 4 perform various calculations based on values detected by the sensors and the like. Based on the results of these calculations, the PCU estimates the controlled state of each cylinder to realize a favorable compression ignition combustion mode.

The injector 9 injects a predetermined amount of fuel according to a target engine torque that is calculated using the opening signal θtp of the throttle 7, the accelerator opening signal α and the like. The variable valve 16a and the variable valve 16b vary valve timing and an amount of valve lift on an intake side and an exhaust side, respectively. They are optimally controlled either hydraulically or through a motor current according to the operating condition. An actual operation control system will be described later.

FIG. 2A through FIG. 2D show the vibration detecting sensor 5 used as the combustion state estimating means for each cylinder, characteristics thereof, and an example of detection made by the sensor.

Figure 2A:
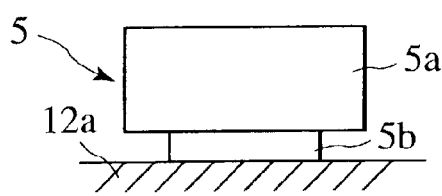
FIGS. 2A to 2D are concerned with the multi-cylinder engine control apparatus shown in FIG. 1, FIG. 2A showing schematically a vibration detecting sensor mounted on the multi-cylinder engine, FIG. 2B showing output characteristics of the vibration detecting sensor, FIG. 2C showing a cylinder pressure history during the multi-cylinder engine operation in the compression ignition combustion mode, and FIG. 2D showing a history of output values detected by the vibration detecting sensor during the multi-cylinder engine operation in the compression ignition combustion mode.

FIG. 2A shows schematically the vibration detecting sensor 5 mounted on the engine 12. The vibration detecting sensor 5 is composed of a transducer 5a as a weight and a piezoelectric device 5b. The sensor 5 is secured to a cylinder block or a cylinder head 12a of the engine 12. The piezoelectric device 5b detects a voltage that corresponds to vibration of the transducer 5a that represents the vibration frequency of the engine 12.

Figure 2B:
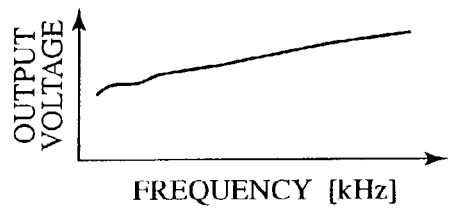
Figure 2C:
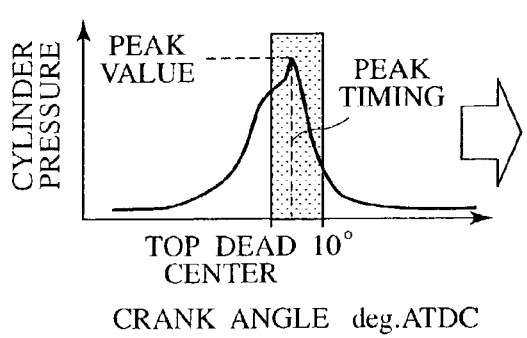
Figure 2D:
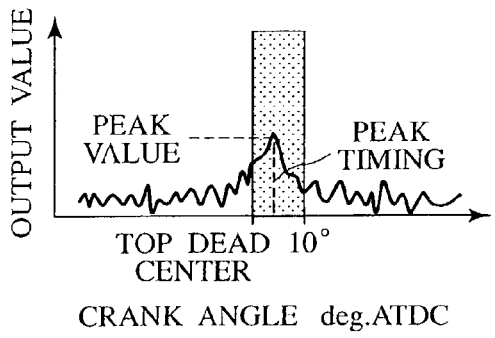

FIG. 2B shows output characteristics of the vibration detecting sensor 5 representing the relation between vibration frequencies of the engine 12 and output voltages of the sensor 5. FIG. 2C shows the relation between cylinder pressures during operations of the engine 12 in the compression ignition combustion mode and crank angles. FIG. 2D shows the relation between output values of the vibration detecting sensor 5 during operations of the engine 12 in the compression ignition combustion mode and crank angles.

The vibration detecting sensor 5 is ordinarily used as a detonation sensor in the spark ignition combustion mode. According to the first embodiment of the present invention, however, the vibration detecting accuracy of the piezoelectric device 5b that contributes to the output of the sensor is more enhanced as compared with that for detonation detection. The frequency of the detected vibration is thus analyzed with a greater accuracy. This allows cylinder pressure peak timing and a peak value in the compression ignition combustion mode to be estimated.

Specifically, if good combustion is carried out during the engine operation in the compression ignition combustion mode, the cylinder pressure peak timing coincides with the peak timing of heat generation at predetermined timing after top dead center as shown in FIG. 2C. Detecting an engine vibration at the cylinder pressure peak timing will, therefore, allow the cylinder pressure peak value to be estimated using an output voltage value corresponding to the engine vibration.

When the detected frequency is subjected to a Fourier analysis and superposed with time-of-day data, the peak timing and peak value for each cylinder can be estimated. Estimation with even greater accuracy is possible of the cylinder pressure peak timing and the peak value, if the detected frequency is subjected to a wavelet transform. FIGS. 2C and 2D show an example of applying this approach. FIG. 2C shows a pressure waveform in compression ignition combustion as detected by the cylinder pressure sensor. FIG. 2D shows an output waveform that is the result of an output detected by the vibration detecting sensor 5 and calculation. As is known from the foregoing, the cylinder pressure peak timing and the peak value can be estimated even with the vibration detecting sensor 5.

Disposing the vibration detecting sensor 5 according to the embodiment at the cylinder block or the cylinder head 12a of the engine 12 makes it possible to estimate the combustion state in the compression ignition combustion mode for each cylinder at low cost. It goes without saying that the vibration detecting sensor 5 according to the embodiment can be used as a detonation sensor in spark ignition combustion.

Control operations of the control apparatus for the engine according to the first embodiment of the present invention will be described in detail.

FIG. 3 shows a flowchart for control operations performed while the engine 12 is running in the compression ignition combustion mode as controlled by the PCU (control device) 1.

In step 1001s, the PCU 1 reads the vehicle operating conditions, signals indicating the user's intention including the accelerator opening α of the engine 12 and the brake signal Sb, and the engine operating conditions as indicated by the engine speed Ne and the like. Then in step 1002s, the PCU 1 determines whether or not the engine 12 is in an operating range for the compression ignition combustion mode based on the readings taken in step 1100s.

When the PCU 1 determines that the engine 12 is in the operating range for the compression ignition combustion mode in step 1002s, it then determines in step 1003s whether or not the operation in the compression ignition combustion mode is being carried out. If the PCU 1 determines that the current operation is being carried out in the spark ignition combustion mode (that is, it is not the compression ignition combustion mode), it proceeds to step 1003as and selects the compression ignition combustion mode before proceeding to step 1004s. If it determines that the current operation is being carried out in the compression ignition combustion mode, it then directly proceeds to step 1004s.

In step 1004s, the PCU 1 reads the output values from the sensors used for estimating the combustion state of each cylinder in the compression ignition combustion mode. In step 1005s, the PCU 1 estimates the cylinder pressure peak timing and the peak value of each cylinder. Specific techniques used for estimating the cylinder pressure in steps 1004s and 1005s will be detailed later.

Then, in step 1006s, the PCU 1 uses the estimated values in steps 1004s and 1005s to determine whether or not the cylinder pressure peak timing of all cylinders falls within the predetermined range. The predetermined range for the cylinder pressure peak timing refers to an approximate range from a point after the top dead center on the compression stroke up to 10° thereafter. The range varies slightly depending on the operating condition. It can nonetheless be determined that the combustion is carried out at proper timing as long as the cylinder pressure peak timing falls within this range in the compression ignition combustion mode.

If it is found that there is a cylinder, the pressure peak timing of which does not fall within the predetermined range, the PCU 1 then proceeds to step 1008s and provides control for the combustion state (the control technique employed will be detailed later). In step 1009s, the PCU 1 determines the amount of deviation in peak timing among different cylinders. If the amount of deviation is a predetermined value or more, or more specifically, if the cylinder pressure peak timing of all cylinders does not fall within the range from a point after the top dead center on the compression stroke up to 10° thereafter, the following could result. That is, it could become impossible to carry out an operation with high efficiency and low exhaust emissions through compression ignition combustion due to a deteriorated or defective engine component. The PCU 1 therefore proceeds to step 1012s and inhibits the operation in the compression ignition combustion mode. In the meantime, it proceeds to step 1013s and notifies the user that the engine is unable to perform a high-efficiency operation. This sequence of control operations is repeated several times to set the operation into the compression ignition combustion mode after the engine has been restarted. If the PCU 1 determines that the compression ignition combustion mode should be inhibited in all of these sequences, it warns the user to have the equipment and engine serviced.

Going back to step 1006s, if the cylinder pressure peak timing of all cylinders falls within the predetermined range, the PCU 1 proceeds to step 1007s and determines whether or not the cylinder pressure peak values of all cylinders fall within the predetermined range. If the cylinder pressure peak values of all cylinders fall within the predetermined range, then the PCU 1 judges that compression ignition combustion is being carried out in a favorable manner.

If it is found that the cylinder pressure peak value of any of the cylinders falls outside the predetermined range, it can be judged that the combustion is not properly carried out. The PCU 1 then proceeds to step 1010s and provides control for the combustion state (the control technique employed will be detailed later). Proceeding then to step 1011s, the PCU 1 determines once again whether or not the cylinder pressure peak values of all cylinders fall within the predetermined range. If it is found that any falls outside the range, control proceeds to steps 1012s and 1013s as described earlier.

To sum up, the procedures performed to estimate and control the combustion state for each cylinder effectively prevent fuel economy and exhaust emissions of the engine 12 and operating performance of the equipment mounted with the engine 12 from being aggravated seriously even when the equipment (vehicle or the like) and the engine 12 deteriorate or there are part-to-part variations among different components. It is therefore possible to provide a multi-cylinder engine 12 that offers outstanding durability and robustness and a piece of equipment mounted with the engine.

Techniques used to estimate and control the combustion state of each cylinder of the engine 12 according to the first embodiment of the present invention will be detailed below with reference to FIGS. 4 to 6.

Figure 4:
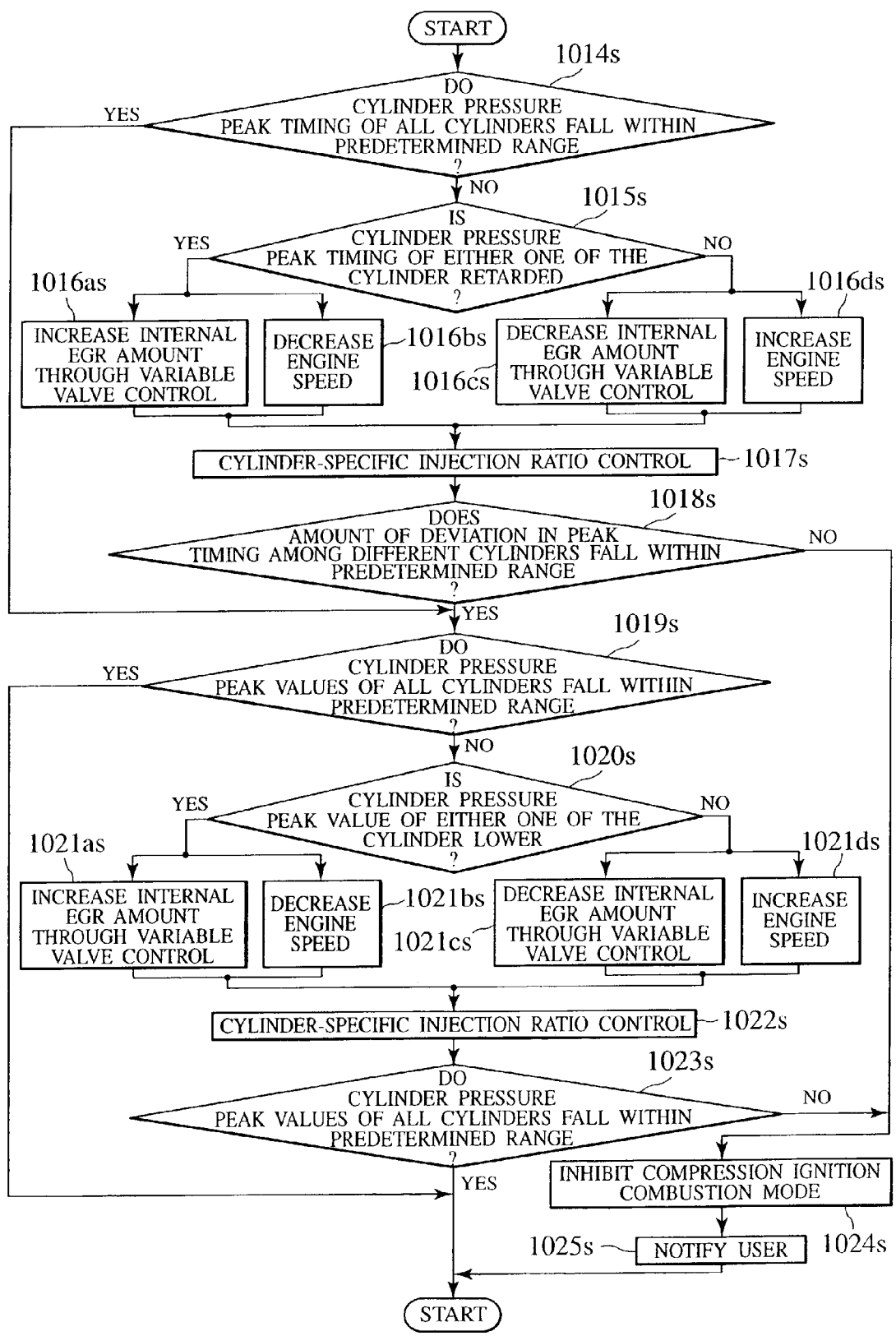
FIG. 4 shows a flowchart for control operations performed by the multi-cylinder engine control apparatus for variable valves and engine speed based on the cylinder pressure peak timing and peak value.

FIG. 4 shows a flowchart for control operations performed for the combustion state control means in the compression ignition combustion mode for each cylinder of the engine 12 according to the first embodiment of the present invention. The combustion state of each cylinder is detected through the procedures described earlier and, based on the detected conditions, compression ignition combustion is controlled for each cylinder.

Based on the estimated results of the combustion state of each cylinder, the PCU 1 determines in step 1014s whether or not the cylinder pressure peak timing of all cylinders falls within the predetermined range. If it is found that the timing falls within the predetermined range, it can be estimated that combustion is carried out at a proper timing in each of all cylinders. Then, the PCU 1 proceeds to step 1019s and determines whether or not the cylinder pressure peak values of all cylinders fall within the predetermined range.

If it is found that the peak timing of any of the cylinders falls outside the predetermined range in step 1014s, the PCU 1 proceeds to step 1015s and determines whether or not the peak timing of the specific cylinder in question is advanced or retarded in relation to timing in the predetermined range. If it is found that the peak timing is retarded, the PCU 1 proceeds to step 1016as and uses the variable valves 16a and 16b to increase the amount of internal EGR, thereby enhancing ignitability of the mixture in all cylinders, that is, advancing the ignition timing. If the engine speed is relatively high (2,000 rpm or more), however, compression ignition combustion can fail due to a decreased amount of intake air as a result of the increased amount of internal EGR. The PCU 1 may proceed to step 1016bs in which the PCU 1 allows the gear ratio setting logic 4 to send a signal to the transmission 17 to slightly decrease the engine speed, thereby increasing the amount of fuel per one cycle for better ignitability, thus achieving an equivalent output. Although not shown in FIG. 4 according to the embodiment, a supercharger device may be provided on the intake side, in which case the amount of intake air may be increased to boost the cylinder pressure, thereby advancing the ignition timing.

If it is found that the peak timing is advanced in step 1015s, the PCU 1 proceeds to step 1016cs and uses the variable valves 16a and 16b to decrease the amount of internal EGR, thereby retarding the ignition timing for all cylinders. At this time, the PCU 1 may proceed to step 1016ds and allow the gear ratio setting logic 4 to send a signal to the transmission 17 to slightly increase the engine speed, thereby decreasing the amount of fuel per one cycle, thus achieving an equivalent output.

After having brought the combustion state of each cylinder into or near the predetermined range through the steps from 1016as to 1016ds, the PCU 1 proceeds to step 1017s. The PCU 1 therein provides an injection ratio control for each cylinder, thus narrowing the cylinder pressure peak timings of different cylinders down to an even shorter period of predetermined timing to enable operations at even higher efficiency.

Proceeding to step 1018s, the PCU 1 determines therein if the amount of deviation in the cylinder pressure peak timing among different cylinders is a predetermined value or more. If the amount of deviation is large, a cylinder, in which combustion is retarded, tends to exhaust unburned HC, while a cylinder, in which combustion is advanced, tends to produce a high-pitch combustion noise or the engine can become easy to be damaged. If the amount of deviation is large, the PCU 1 proceeds to step 1024s and inhibits the compression ignition combustion mode. At the same time, the PCU 1 notifies the user of the equipment that the engine is unable to perform a high-efficiency operation (in step 1025s). The PCU 1 allows the engine to enter the compression ignition combustion mode if required conditions are met when the engine is restarted after the notification. Determining that the compression ignition combustion mode should be inhibited for a number of consecutive times, the PCU 1 warns the user to have the equipment and engine serviced.

If the PCU 1 determines in step 1018s that the amount of deviation falls within the predetermined range, the PCU 1 proceeds to step 1019s to determine whether or not the cylinder pressure peak values of all cylinders fall within the predetermined range. If the cylinder pressure peak values of all cylinders fall within the predetermined range, then the PCU 1 can estimate that combustion is being carried out at proper timing in all cylinders.

If it is determined in step 1019s that the cylinder pressure peak value of any of the cylinders falls outside the predetermined range, the PCU 1 proceeds to step 1020s and determines whether the peak value of the cylinder in question is higher or lower than the predetermined range. If the peak value is lower, the PCU 1 proceeds to step 1021as and uses the variable valves 16a and 16b to increase the amount of internal EGR. This enhances ignitability of the mixtures in all cylinders, thus yielding a state in which heat generation tends to occur through combustion. If the engine speed is relatively high (2,000 rpm or more), however, compression ignition combustion can fail due to a decreased amount of intake air as a result of the increased amount of internal EGR. Then, the PCU 1 may proceed to step 1021bs, in which the PCU 1 allows the gear ratio setting logic 4 to send a signal to the transmission 17 to slightly decrease the engine speed, thereby increasing the amount of fuel per one cycle for better ignitability, thus achieving an equivalent output. Although not shown in FIG. 4 according to the embodiment, a supercharger device may be provided on the intake side, in which case the amount of intake air may be increased to boost the cylinder pressure, thereby enhancing ignitability.

If the peak value is found to be higher in step 1020s, the PCU 1 proceeds to step 1021cs and uses the variable valves 16a and 16b to decrease the internal EGR amount, thereby decreasing the cylinder temperature so as to make heat generation through combustion milder. At this time, the PCU 1 may proceed to step 1021ds and allow the gear ratio setting logic 4 to send a signal to the transmission 17 to slightly increase the engine speed, thereby decreasing the amount of fuel per one cycle, thus achieving an equivalent output.

After having brought the combustion state of each cylinder into or near the predetermined controlled range through steps 1021as to 1021ds, the PCU 1 proceeds to step 1022s. The PCU 1 therein provides an injection ratio control for each cylinder, thus narrowing the cylinder pressure peak timing of different cylinders down to an even shorter period of predetermined timing and bringing the peak values into the predetermined range to enable operations at even higher efficiency.

Proceeding to step 1023s, the PCU 1 determines therein if the amount of deviation in the cylinder pressure peak value among different cylinders falls within a predetermined range. If the amount of deviation falls outside the range, the PCU 1 proceeds to step 1024s and inhibits the compression ignition combustion mode. At the same time, the PCU 1 notifies the user of the equipment that the engine is unable to perform a high-efficiency operation (in step 1025s). The PCU 1 allows the engine to enter the compression ignition combustion mode if required conditions are met when the engine is restarted after the notification. If the PCU 1 determines that the compression ignition combustion mode should be inhibited for a number of consecutive times, the PCU 1 warns the user to have the equipment and engine serviced.

The combustion state control procedures as described in the foregoing function to smooth out varying combustion states among different cylinders. This therefore prevents the combustion state from being varied due to variations and deterioration in engine components, thus enabling an operation with high efficiency and low exhaust emissions.

Figure 5:
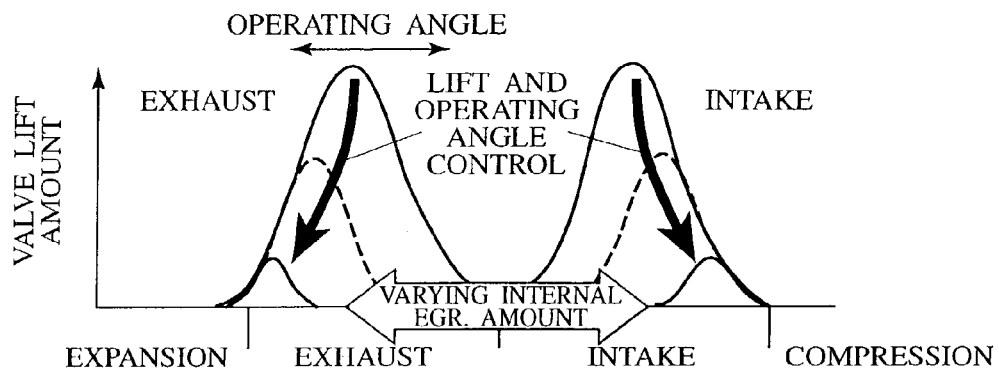
FIG. 5 shows typical lift curve characteristics of the intake and exhaust variable valves used in the multi-cylinder engine control apparatus shown in FIG. 1.

FIG. 5 shows typical lift curve characteristics of the intake and exhaust variable valves 16a, 16b used in the embodiment of the present invention. According to the embodiment, variable valves are used for intake and exhaust valves 16a, 16b to accomplish the following task. That is, the valve lift amount and the operating angle of these valves are controlled as shown in FIG. 5 to vary a period of time during which the exhaust is shut off (hereinafter referred to as the minus overlap period), thereby continuously controlling the amount of internal EGR.

A solenoid driven valve may, in this case, be provided for each cylinder to continuously vary the minus overlap period. This, however, could substantially drive up cost as the number of cylinders increases in the multi-cylinder engine. A configuration as detailed in the following is therefore provided to achieve the objects of the present invention. That is, there is provided a device that varies the valve lift amount and the operating angle for all cylinders at the same time, with which the minus overlap amount can be continuously variable depending on the operating conditions.

Figure 6A:
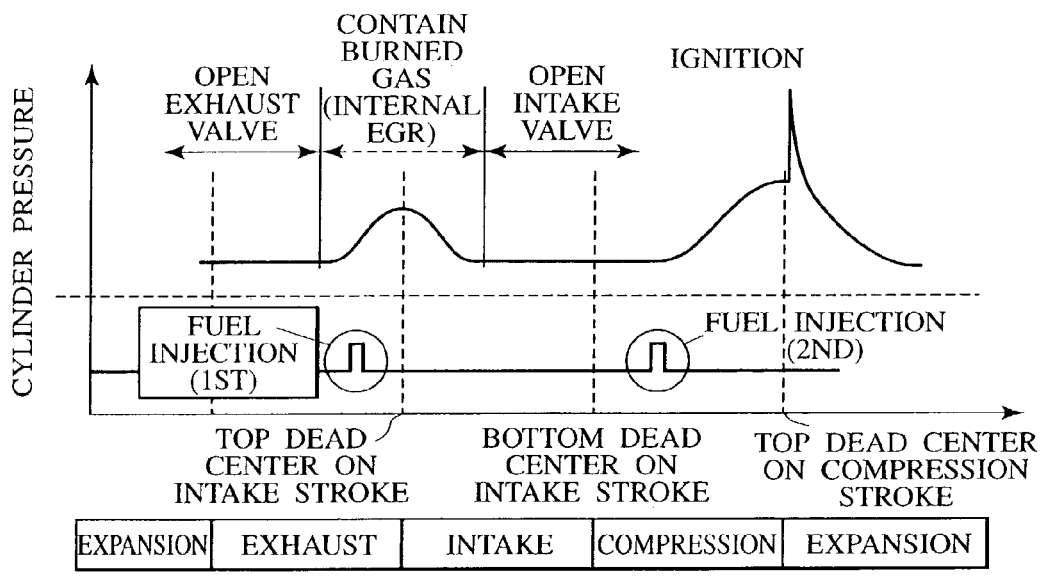
FIGS. 6A and 6B show a typical fuel injection control technique employed in the multi-cylinder engine control apparatus shown in FIG. 1, FIG. 6A showing the timings at which the intake and exhaust variable valves are opened and closed and fuel is injected (a plurality of times) and FIG. 6B showing the relationship between the first fuel injection amount and the compression ignition timing.
Figure 6B:
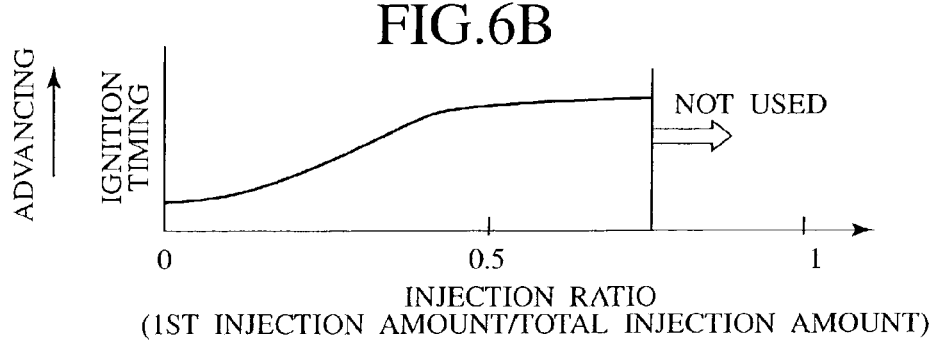

FIGS. 6A and 6B show a typical fuel injection control technique employed according to the embodiment of the present invention. Since the fuel injection system employed in the embodiment is direct injection, the condition of the mixture can be controlled by changing the injection timing and the like according to the operating condition.

Referring to FIG. 6A, a fuel injection sequence is carried out a plurality of times. The first sequence is carried out during the minus overlap period so as to make part of the fuel radical. The ratio of injection is then varied among different cylinders, thereby suppressing variations in the combustion state among different cylinders.

Referring to FIG. 6B, in a range where the ratio of the amount of fuel injected in the first injection sequence is large, combustion may occur during the exhaust stroke or the intake stroke. Specifically, the injection ratio control is therefore provided to ensure that the ratio of the amount of fuel injected in the first injection sequence does not exceed ¾ of the total amount of fuel injected.

Figure 7A:
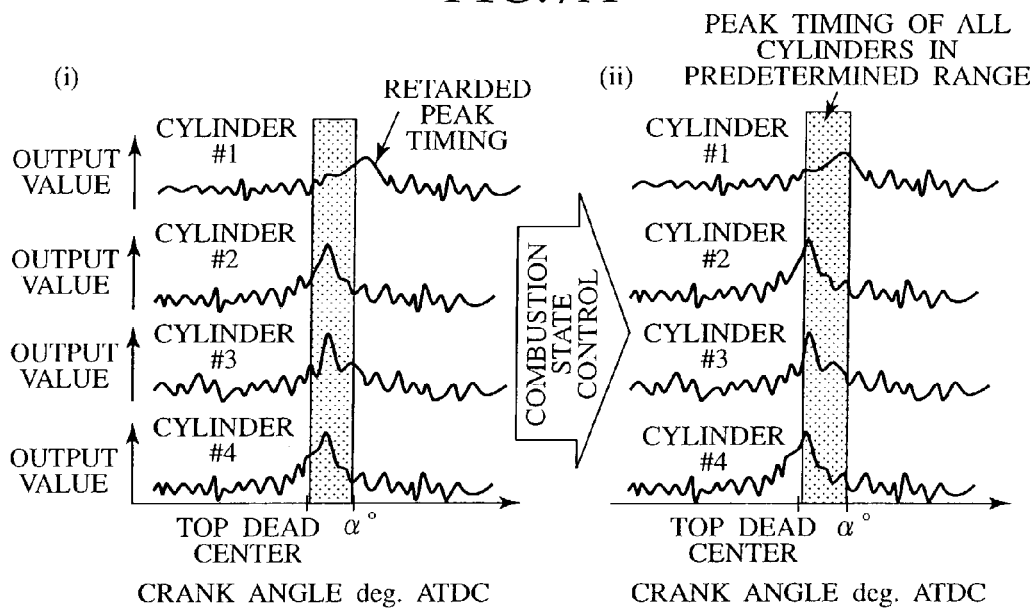
FIGS. 7A and 7B show the cylinder pressure peak timing and peak value of each cylinder while the multi-cylinder (four-cylinder) engine is running in the compression ignition combustion mode, FIG. 7A(i) showing where the cylinder pressure peak timing of a specific cylinder is retarded, FIG. 7A(ii) showing where the state of FIG. 7A(i) has been corrected through combustion control, FIG. 7B(i) showing where the cylinder pressure peak value of a specific cylinder is low, and FIG. 7B(ii) showing where the state of FIG. 7B(i) has been corrected through combustion control.
Figure 7B:
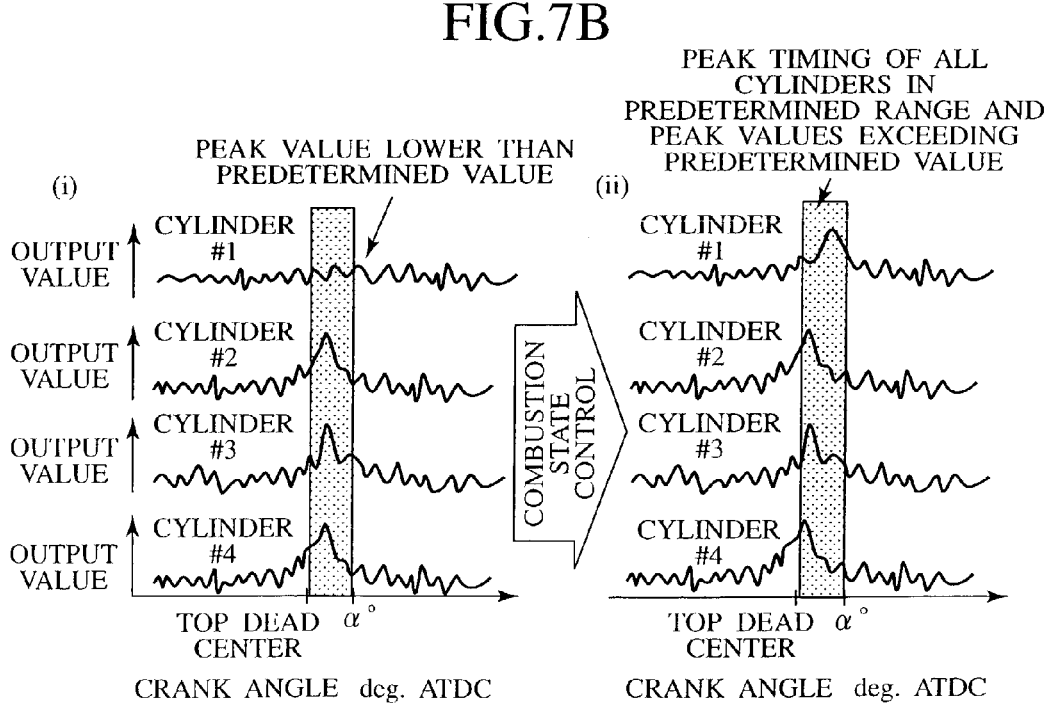

FIGS. 7A and 7B show combustion states of a four-cylinder engine, representing the techniques used to estimate and control the combustion state of each cylinder described in the foregoing as they are applied to the operation of the four-cylinder engine in the compression ignition combustion mode.

FIG. 7A(i) shows a state in which the cylinder pressure peak timing of cylinder no. 1 (#1) deviates from the predetermined range (that is, retarded) under a certain operating condition. When the combustion state control technique described in the foregoing is applied thereto, the cylinder pressure peak timing of all cylinders falls within the predetermined range, enabling an operation at high efficiency with low exhaust emissions, as shown in FIG. 7A(ii). If the execution of the combustion state control does not bring the cylinder pressure peak timing of all cylinders into the predetermined range, it is difficult to keep the engine operation at high efficiency with low exhaust emissions. The compression ignition combustion mode is then inhibited and the user of the equipment mounted with the engine is notified of it.

FIG. 7B(ii) shows a state in which the cylinder pressure peak value of cylinder no. 1 (#1) is lower than the predetermined value under a certain operating condition. In such a case, the peak value and the peak timing are not sufficiently clear and identifiable as depicted in FIG. 7B(i). The engine is then likely to exhaust a large amount of unburned HC and the like, with reduced combustion efficiency due to misfire and incomplete combustion. When the combustion state control technique as described in the foregoing is applied thereto, the cylinder pressure peak timing of all cylinders is brought into the predetermined range and the peak values become the predetermined value or more as shown in FIG. 7B(ii). It tells that the engine is running at high efficiency with low exhaust emissions.

In the same manner as with FIG. 7A, if the execution of the combustion state control does not bring the cylinder pressure peak timing of all cylinders into the predetermined range, or if the cylinder pressure peak value remains lower than the predetermined value even after the execution of the control, it is difficult to keep the engine operation at high efficiency with low exhaust emissions. The compression ignition combustion mode is then inhibited and the user of the equipment mounted with the engine is notified of it.

The engine 12 according to the embodiment of the present invention employs a direct injection system for fuel injection. A system, in which fuel is injected into the intake pipe, may of course be used instead. Such a system, however, defies the injection ratio control for each cylinder. The same effect can still be implemented using a combustion state control of other form.

It has been mentioned that the CVT (continuously variable transmission), with which a required speed can easily be achieved, should preferably be used for the transmission 17. However, the combustion state control described for the embodiment of the present invention can still be realized even with a stepped gear transmission (or manual transmission or MT) and a stepped gear automatic transmission (or automatic transmission or AT).

Figure 8:
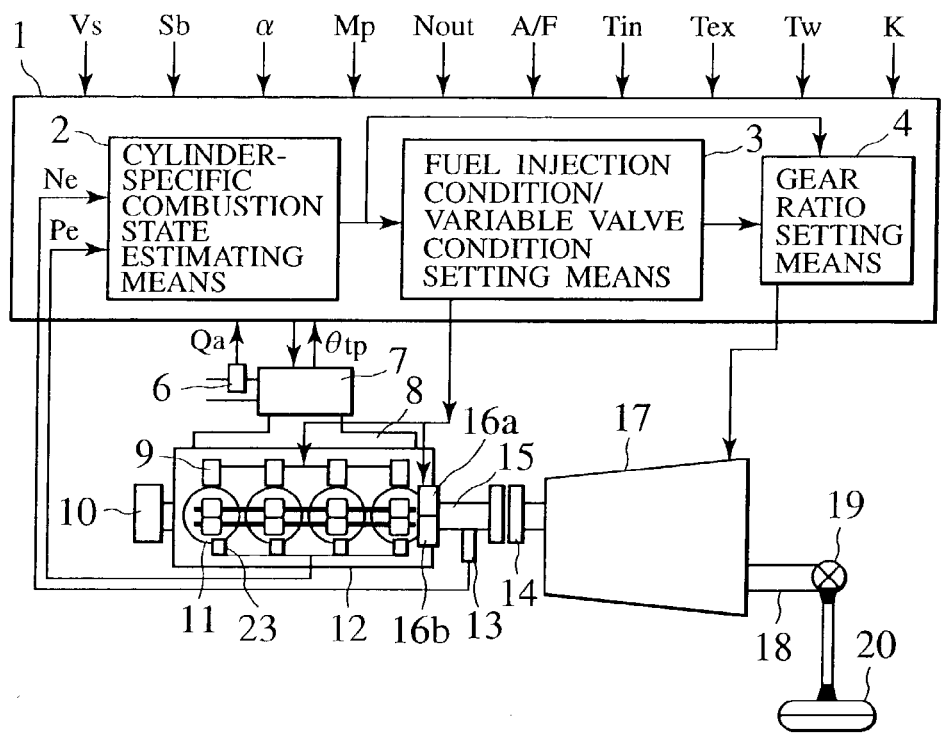
FIG. 8 is a system configuration diagram showing a multi-cylinder engine control apparatus according to a second embodiment of the present invention.

FIG. 8 is a system configuration diagram showing an engine control apparatus according to a second embodiment of the present invention. A cylinder pressure sensor 23 is used as the sensor for providing an input signal for the combustion state estimating means for each cylinder. Providing the cylinder pressure sensor 23 for each cylinder naturally drives up cost. It, however, allows the control apparatus to estimate the combustion state in each cylinder even more accurately. An engine operation at even higher efficiency with even lower exhaust emissions can therefore be achieved as compared with the control apparatus according to the first embodiment of the present invention.

Figure 9:
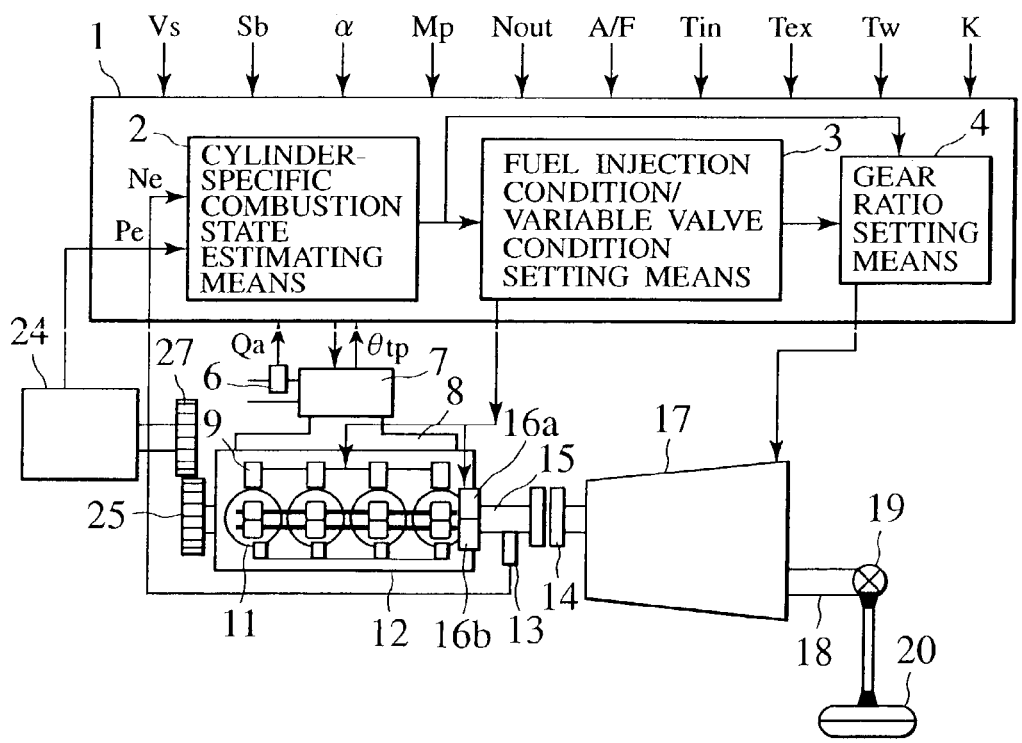
FIG. 9 is a system configuration diagram showing a multi-cylinder engine control apparatus according to a third embodiment of the present invention.

FIG. 9 is a system configuration diagram showing an engine control apparatus according to a third embodiment of the present invention. A rotary electric motor (hereinafter referred to as the "motor") 24 connected by way of gears 25, 27 to the output shaft 15 of the engine is used as the sensor for providing an input signal for the combustion state estimating means for each cylinder. The motor 24 allows the engine torque during the compression ignition combustion mode to be detected highly accurately, allowing the system to estimate the combustion state of each cylinder.

In addition, the motor is ordinarily capable of assisting in the engine torque as employed in a hybrid vehicle or suppressing variations in torque during gear-shifting or combustion mode switching. It thus offers a great benefit of introduction as a system.

Figure 10:
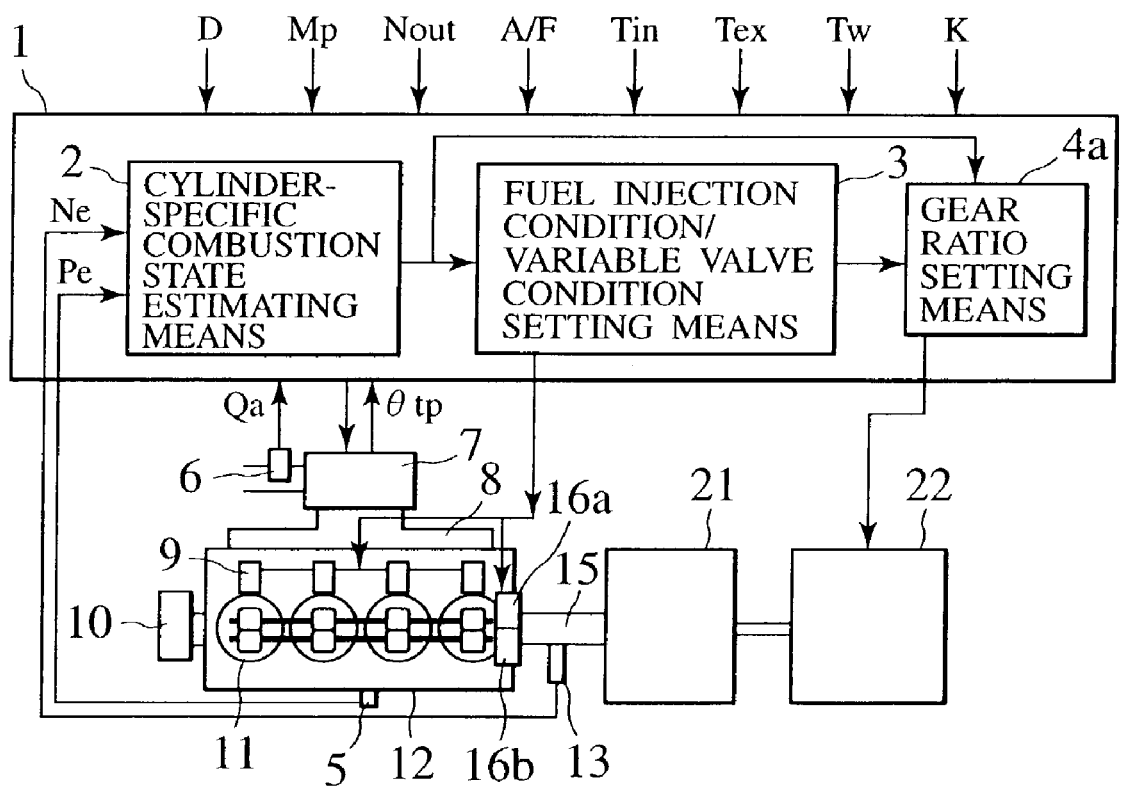
FIG. 10 is a system configuration diagram showing a multi-cylinder engine control apparatus according to a fourth embodiment of the present invention.

FIG. 10 is a system configuration diagram showing an engine control apparatus, according to a fourth embodiment of the present invention, mounted on a generator. The generator shown in FIG. 10 is provided with a motor generator 21 and an inverter 22. The engine 12 may be configured as that described in the first, the second, or the third embodiment.

Referring to FIG. 10, the output from the engine 12 is supplied by way of the motor generator 21 and the inverter 22 to an external apparatus as electric power. The PCU 1 reads external information D (such as weather conditions, circuit conditions, power requirements and the like) while the equipment is running. The signal fed from a speed ratio setting means 4a to the inverter 22 is used, at this time, to control the input speed and the output frequency, thereby controlling the engine speed. This allows the combustion state of each cylinder to be estimated and controlled as described earlier. That is, the application of the control apparatus according to the fourth embodiment of the present invention to the generator makes possible equipment operations at high efficiency with low exhaust emissions, just as in the embodiments described heretofore.

Although the present invention has been described in connection with what are conceived to be practical and preferred embodiments, it is to be understood that departures may be made therefrom within the spirit and scope of the invention, which is not limited to the illustrative details disclosed.

As can be understood from the foregoing descriptions, the control apparatus for a multi-cylinder engine according to the preferred embodiments of the present invention is capable of appropriately controlling the cylinder pressure peak value and peak timing of each cylinder during the engine operation in the compression ignition combustion mode. This can suppress variations in the combustion state among different cylinders and different cycles during the engine operation in the compression ignition combustion mode, thus realizing compression ignition combustion offering good fuel consumption and exhaust emissions characteristics.

What is claimed is:

1. A control apparatus for a multi-cylinder engine capable of performing compression ignition combustion, or selecting either the compression ignition combustion or spark ignition combustion, comprising:
   a cylinder-specific combustion state estimating means for estimating a combustion state for each cylinder; and
   a combustion state control means for controlling the combustion state for each cylinder;
   wherein the combustion state control means controls, during an engine operation in a compression ignition combustion mode, the combustion state for each cylinder based on the combustion state estimated by the cylinder-specific combustion state estimating means during the engine operation in the compression ignition combustion mode, wherein the combustion state control means controls at least one of a variable valve mechanism that varies an amount of internal EGR by changing at least one of the valve timing and an amount of valve lift of an intake valve and an exhaust valve, a fuel injection mechanism that directly or indirectly injects fuel into a combustion chamber of the multi-cylinder engine, and a transmission that transmits output shaft torque of the multi-cylinder engine to a power train mechanism of a vehicle through adjusting a gear ratio, and the combustion state control means controls the transmission so as to change the gear ratio, thereby decreasing an engine speed when it is estimated that the peak value of cylinder pressure of at least one of the plurality of cylinders is lower than a predetermined value, or the peak timing of cylinder pressure is retarded in relation to predetermined timing, based on the estimation made by the cylinder-specific combustion state estimating means.

2. The control apparatus for the multi-cylinder capable of performing compression ignition combustion, or selecting either the compression ignition combustion or spark ignition combustion, comprising:
   a cylinder-specific combustion state estimating means for estimating a combustion state for each cylinder; and
   a combustion state control means for controlling the combustion state for each cylinder;
   wherein the combustion state control means controls, during an engine operation in a compression ignition combustion mode, the combustion state for each cylinder based on the combustion state estimated by the cylinder-specific combustion state estimating means during the engine operation in the compression ignition combustion mode, wherein the combustion state control means controls at least one of a variable valve mechanism that varies an amount of internal EGR by changing at least one of the valve timing and an amount of valve lift of an intake valve and an exhaust valve, a fuel injection mechanism that directly or indirectly injects fuel into a combustion chamber of the multi-cylinder engine, and a transmission that transmits output shaft torque of the multi-cylinder engine to a power train mechanism of a vehicle through adjusting a gear ratio, and the combustion state control means controls the transmission so as to change the gear ratio, thereby increasing the engine speed when it is estimated that the peak value of cylinder pressure of at least one of the plurality of cylinders is higher than the predetermined value, or the peak timing of cylinder pressure is advanced in relation to the predetermined timing, based on the estimation made by the cylinder-specific combustion state estimating means.

3. The control apparatus for the multi-cylinder engine according to claim 2, wherein the combustion state control means increases an amount of fuel supplied from the fuel injection mechanism to each cylinder per one cycle.

4. The control apparatus for the multi-cylinder engine according to claim 1, wherein the combustion state control means decreases an amount of fuel supplied from the fuel injection mechanism to each cylinder per one cycle.

5. A control apparatus for the multi-cylinder engine capable of performing compression ignition combustion, or selecting either the compression ignition combustion or spark ignition combustion, comprising:
   a cylinder-specific combustion state estimating means for estimating a combustion state for each cylinder; and
   a combustion state control means for controlling the combustion state for each cylinder;
   wherein the combustion state control means controls, during an engine operation in a compression ignition combustion mode, the combustion state for each cylinder based on the combustion state estimated by the cylinder-specific combustion state estimating means during the engine operation in the compression ignition combustion mode, wherein, if the cylinder-specific combustion state estimating means estimates that a cylinder pressure peak value of at least one cylinder out of the plurality of cylinders falls outside a predetermined range, or the cylinder pressure peak timing of at least one of the plurality of cylinders falls outside a predetermined period of time, the control apparatus inhibits the compression ignition combustion mode for the multi-cylinder engine, or switches the operating mode to the spark ignition combustion mode, and warning equipment is operated if the compression ignition combustion mode is inhibited.

6. A control method for the multi-cylinder engine that performs compression ignition combustion control or provides control so as to select either the compression ignition combustion or spark ignition combustion, comprising the steps of:
   estimating, during an engine operation in the compression ignition combustion mode, a combustion state for each cylinder during the engine operation in the compression ignition combustion mode; and
   controlling the combustion state of each cylinder based on the estimated combustion state for each cylinder, wherein the step of estimating the combustion state of each cylinder is to estimate a peak value of cylinder pressure of each cylinder and peak timing of the cylinder pressure and the step of controlling the combustion state is to ensure that the peak value of the cylinder pressure of each cylinder falls within a predetermined range and/or the peak timing falls within a predetermined period of time after piston top dead center, and the cylinder pressure of each cylinder represents a value that is the result of analyzing a vibration frequency detected of the multi-cylinder engine.

7. A control method for a multi-cylinder engine that performs compression ignition combustion control or provides control so as to select either compression ignition combustion or spark ignition combustion, comprising estimating, during an engine operation in the compression ignition combustion mode, the combustion state for each cylinder during the engine operation in the compression ignition combustion mode; and
   controlling the combustion state by allowing a variable valve mechanism of the cylinder to increase or decrease a minus overlap amount so as to increase or decrease an amount of internal EGR, if at least either one of the following conditions is estimated, the conditions being that a peak value of the cylinder pressure of at least one cylinder of all the plurality of cylinders is lower or higher than a predetermined value, and that a peak timing of the cylinder pressure is retarded or advanced in relation to predetermined timing, and
   allowing a transmission to change a gear ratio so as to increase or decrease an engine speed, thereby increasing or decreasing the amount of fuel supplied from a fuel injection mechanism to each cylinder per one cycle, if at least either one of the following conditions is estimated, the conditions being that the peak value of the cylinder pressure of at least one cylinder of all the plurality of cylinders is lower or higher than a predetermined value, and that the peak timing of the cylinder pressure is retarded or advanced in relation to a predetermined timing.

8. The control method for the multi-cylinder engine according to claim 6, wherein other combustion states including a mode changeover between spark ignition combustion and compression ignition combustion is controlled based on the operating condition of the multi-cylinder engine, the operating condition of a piece of equipment mounted with the multi-cylinder engine and, an intention of a user of the equipment.

* * * * *

UNITED STATES PATENT AND TRADEMARK OFFICE
CERTIFICATE OF CORRECTION

PATENT NO. : 7,128,048 B2
APPLICATION NO. : 10/390771
DATED : October 31, 2006
INVENTOR(S) : Shiro Yamaoka It is certified that error appears in the above-identified patent and that said Letters Patent is hereby corrected as shown below:

Title Page, (75) Inventors: the last name of the first inventor is --Yamaoka--

Signed and Sealed this

Sixth Day of March, 2007

JON W. DUDAS
*Director of the United States Patent and Trademark Office*